May 10, 1938.    B. E. BARNES    2,116,875
REPAIR LINK
Filed Oct. 28, 1935    2 Sheets-Sheet 1
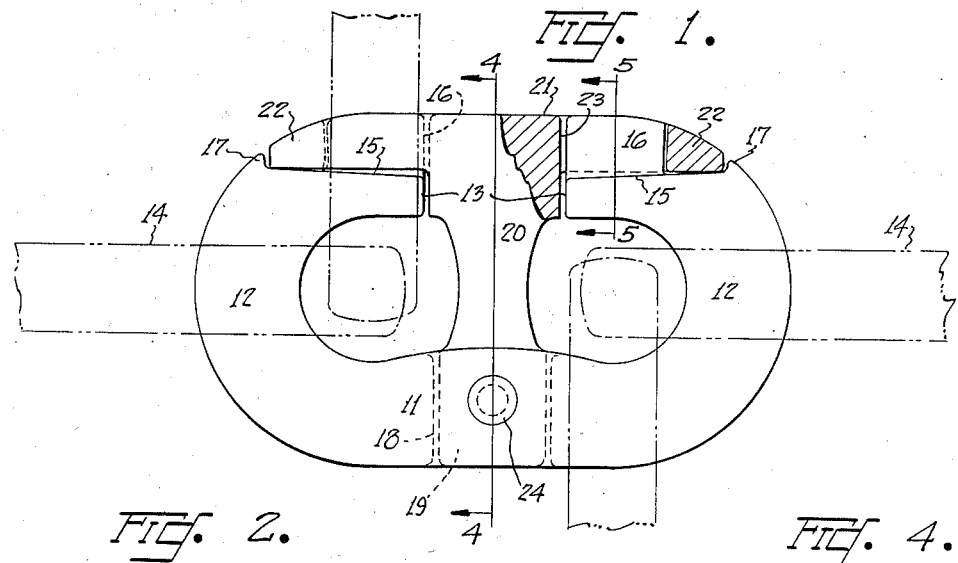
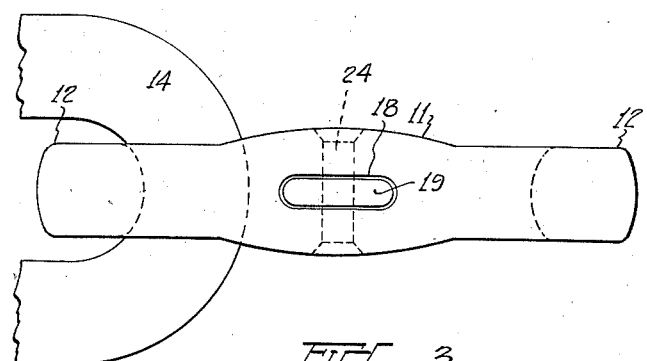
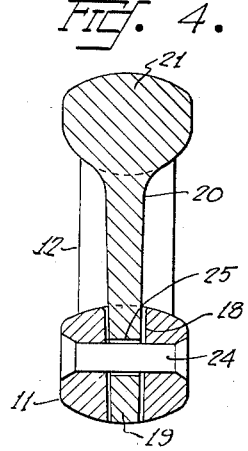
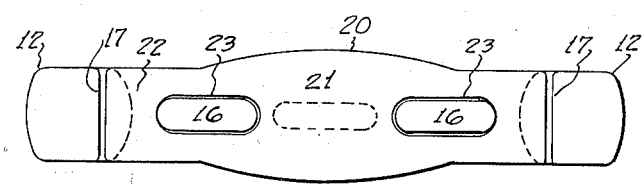
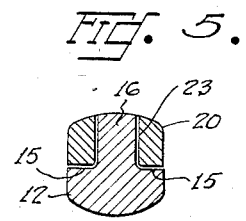
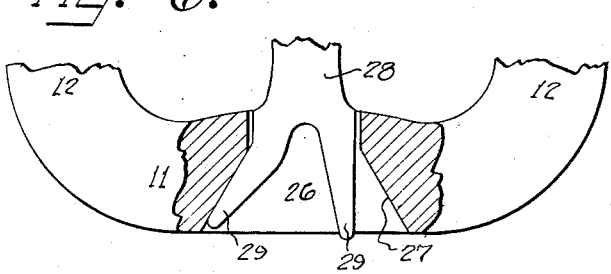
INVENTOR
B. E. BARNES
BY
ATTORNEY May 10, 1938.  B. E. BARNES  2,116,875
REPAIR LINK
Filed Oct. 28, 1935  2 Sheets-Sheet 2

INVENTOR
B. E. BARNES
ATTORNEY

Patented May 10, 1938

2,116,875

REISSUED

UNITED STATES PATENT OFFICE 2,116,875

REPAIR LINK

Brown E. Barnes, Portland, Oreg., assignor to Electric Steel Foundry Company, Portland, Oreg.

Application October 28, 1935, Serial No. 47,086

1 Claim. (Cl. 59—84)

This invention relates generally to chains, and particularly to a repair link therefor.

The main object of this invention is the construction of a repair link which can be easily inserted into a chain as a replacement part in a minimum amount of time and with the use of ordinary tools.

The second object is the construction of a repair link which will not detract from the flexibility of a chain.

The third object is the construction of a repair link which will not present objectionable projections when assembled.

The fourth object is the construction of a repair link in which the fastening rivets will not be placed under stress and that the link will not be objectionably affected by wear more than an ordinary solid link would be.

I accomplish these and other objects in the manner set forth in the following specification as illustrated in the accompanying drawings, in which:

Fig. 1 is a side elevation of one form of the link showing a part broken away in section.

Fig. 2 is an edge elevation of a link showing a fragment of an adjacent link and showing the fastening means.

Fig. 3 is also an edge elevation taken from the opposite side of the link and showing the closure.

Fig. 4 is a section taken along the line 4—4 in Fig. 1.

Fig. 5 is a section taken along the line 5—5 in Fig. 1.

Fig. 6 is a fragmentary view showing a modified fastening means.

Similar numbers of reference refer to similar parts throughout the several views.

Figure 7:
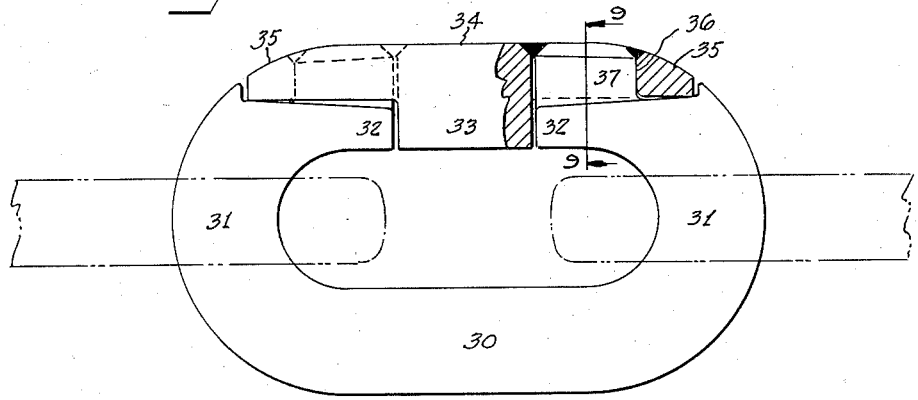
Fig. 7 is a side elevation of a modified form of the link with a part broken away in section.
Figure 8:
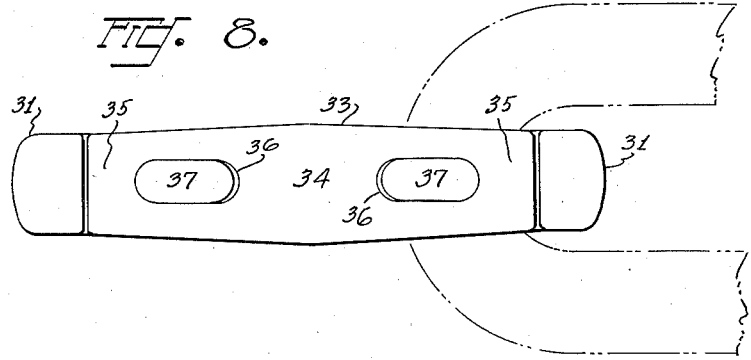
Fig. 8 is an edge elevation of the link shown in Fig. 7.
Figure 9:
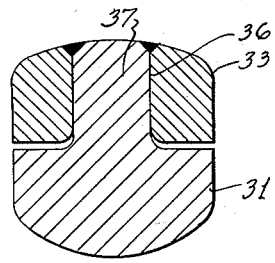
Fig. 9 is a section taken along the line 9—9 in Fig. 7.

Referring in detail to the drawings, there is shown in Figs. 1 to 6 a link having a closed side 11 and the backwardly turned ends 12 whose tips 13 are sufficiently far apart to easily admit a standard link 14. Each tip 13 is provided with a straight outer side 15 from which projects outwardly a lug 16. The straight sides 15 are provided with shields 17 at their outer end to prevent material from wedging between the straight sides 15 and the connection part about to be described.

The side 11 is provided with an opening 18 into which extends the shank 19 of the T-bar 20, whose upper end 21 constitutes the closure for the open side of the link. The tips 22 of the end 21 are rounded to conform with the contour of the link. The tips 22 are provided with slots 23 to receive the lugs 16. A rivet 24 extends through the side 11 and through the opening 25 in the T-bar 20. In the form of the device shown in Fig. 6, instead of employing a rivet 24, the slot 26 has its sides 27 flared and the T-bar 28 is split to form the two points 29 which are spread against the sides 27.

In the form of the device shown in Fig. 7, the link has one closed side 30 and the two inturned ends 31, whose tips 32 are spaced to receive a gate 33 whose end 34 constitutes the closure side of the link. The tips 35 of the end 34 are provided with slots 36 to receive the shanks 37 of the inturned ends 31. The shanks 37 may be tack-welded or riveted as desired.

It will be noted that in this form of the device, the gate 33 is not tied to the side 31 as in the first described form of the device, dependence being placed upon the welding or riveting of the shanks 37 within the slots 36.

Figure 10:
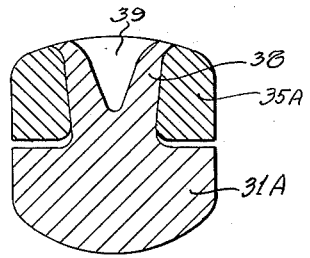
Fig. 10 is a view similar to Fig. 9 but showing a modified form of fastener.

In the form of the device shown in Fig. 10, the fastening is made by spreading the shank 38 into a correspondingly flared opening 39, the shank 38 being a part of the inturned end 31—A, and the opening 39 being formed in the tips 35—A.

It can be seen that in the use of this device for the purpose of replacing a broken link in a chain, it is only necessary to insert the two links 14 and then put the T-bar 20 in position, as shown in Fig. 1, and then drive the rivet 24. It follows that any strain on the chain will place the member 21 in tension and the only function of the rivet 24 is to prevent the T-bar 20 from leaving its position. Under ordinary conditions the link ends 12 are sufficient to carry the load, and any excess load will simply place the member 21 in tension.

In the form of the device shown in Fig. 7, the same condition exists except that the welding or riveting on the shanks 37 takes the place of the rivet 24 in the first described form of the device.

It is desirable to make the sides 15 somewhat inclined toward the opening between the tips 13, first to insure a tight fit at the tips 22 and second to offset any distortions which may arise during the casting process which frequently tends to bend the tips 13 outwardly.

It must be understood that numerous forms of repair links have been constructed in the past, most of which however are objectionable on account of their irregular shape as compared with the chained links themselves or that the repair link is weakened by placing the strains upon the rivets. I, therefore, am not claiming repair links broadly, but I do intend to cover all such forms or modifications thereof that fall fairly within the appended claim.

I claim:

A repair link of the class described having one slotted straight side and having two rounded ends, the tips of which face each other in spaced relationship to form an opening opposite said slotted side, the outer faces of said tips having lugs projecting therefrom in parallelism with each other, said outer faces converging toward the opening between the tips, a closure for said opening consisting of a T-shaped member, the shank of which extends through the space between said tips into said slotted side, means for securing said shank to said slotted side, the underface of said T being substantially perpendicular to the axis of the shank and the outermost ends of said T being in engagement with the outer converging faces, the cross bar of said T-shaped member having openings formed therethrough on opposite sides of said shank in parallelism therewith, said openings being adapted to receive the lugs on said tips.

BROWN E. BARNES.